Nov. 17, 1936.  G. MONTGOMERY  2,061,039
TIRE CHAIN
Filed April 27, 1935
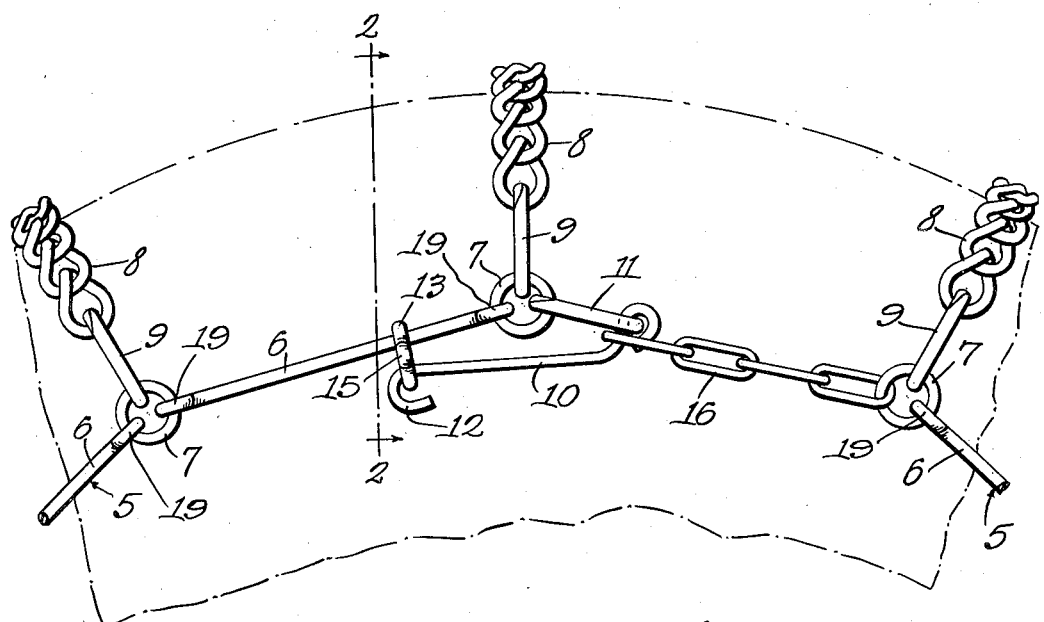
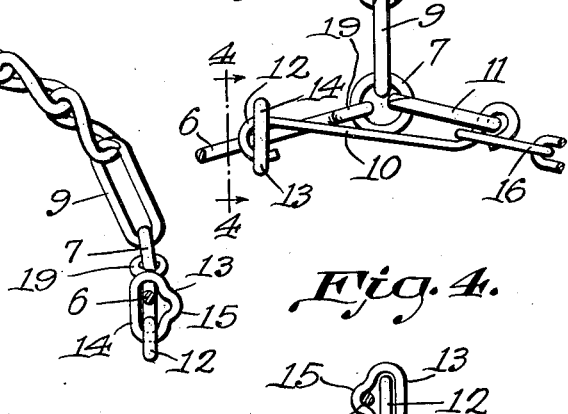
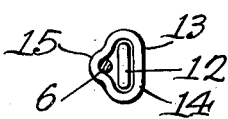
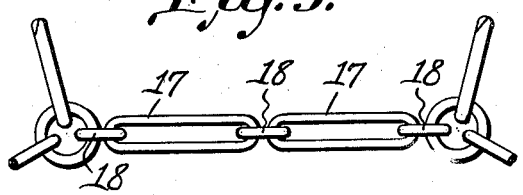
Inventor
Guy Montgomery Patented Nov. 17, 1936

2,061,039

UNITED STATES PATENT OFFICE 2,061,039

TIRE CHAIN

Guy Montgomery, Humboldt, Nebr.

Application April 27, 1935, Serial No. 18,666

2 Claims. (Cl. 24—69)

This invention relates to anti-skid chain construction for use in connection with motor vehicle wheels, and aims to provide an anti-skid chain wherein the side or supporting sections thereof are of such a construction that they will lie closely against the side walls of the tire with which the chain is used.

An important object of the invention is the provision of supporting chains of a construction which will not clog with mud or foreign matter to render the chain heavy and bulky in operation.

Another object of the invention is to construct an anti-skid chain wherein the cross chains and side chains are connected by means of rings which will rotate freely while the chain is in use, thereby changing the points of wear between the rings and links of the side chains connected therewith, materially increasing the life and durability of the chain.

Still another object of the invention is the provision of an anti-skid chain constructed in such a way that it may be reversed when one side thereof becomes worn, thereby providing a chain with double wear qualities.

A further object of the invention is to provide a fastener for securing the ends of the chain together in such a way that the ends of the chain will not become accidentally disconnected while in use, and may only be released by moving the keeper ring of the fastener to a predetermined position.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a side elevational view illustrating an anti-skid chain constructed in accordance with the invention, as mounted on a vehicle wheel.

Figure 2 is a sectional view taken on line 2—2 of Figure 1.

Figure 3 is an elevational view illustrating the hook at one side of the chain as being passed through the retainer ring, connecting the ends of the chain.

Figure 4 is a sectional view taken on line 4—4 of Figure 3.

Figure 5 is an elevational view of a modified form of side or supporting chain.

Referring to the drawing in detail, the anti-skid chain embodies side or supporting chains indicated generally by the reference character 5, and as shown these supporting chains embody elongated links 6, each link 6 being of a length to extend between adjacent cross chains.

The ends of the links 6 are bent around the rings 7, the extremities of the links being welded to the main portions thereof forming exceptionally strong eyes 19, which permits the rings 7 to rotate freely therein, when the chain is in use, changing the points of wear between the rings 7 and eyes 19.

These rings 7 are so constructed that they lie flat against the sides of the tire with which they are used, eliminating any possibility of foreign matter entering between the rings and tire to bend or stretch the links 6 where they connect with the rings 7 to cause the links and rings to become disconnected.

The cross chains are indicated by reference character 8, and are connected to the rings 7, by means of the open links 9 to the end that the cross chains may be readily and easily removed or replaced.

The fastening member forms an important feature of the invention, and includes a hook 10 which has one of its ends secured to the link 11 that has connection with the ring 7, at one of the ends of the chain. This hook 10 is of a length to extend in parallel relation with the link 6 associated therewith, the hook end 12 thereof adapted to be passed through the keeper ring 13, which is slidably mounted on the link 6 at one end of the chain.

The keeper ring 13 is of a novel construction and has a substantially straight side 14 and an offset side 15, the construction and size of the keeper ring 13 being such that it will be impossible to remove the hook 12 from the ring 13 unless the offset portion 15 thereof is moved to a position to accommodate the link 6, as shown by the drawing, whereupon the hook 12 may now be moved in parallel relation with the side 14 of the keeper ring, and slid from the keeper ring.

It will of course be understood that the opposite end links of the chain, indicated by the numeral 16, are positioned over the hooks 10 in a manner as shown by the drawing, and that when the hooks 12 have been properly positioned within the keeper rings and the keeper rings turned to secure the hooks, the ends of the chain will be held securely together.

A modified form of side or supporting chains is shown by Figure 5 of the drawing, and includes a plurality of links 17 connected by rings 18. When this form of side or supporting chain is used, the keeper rings will of course be mounted on one of the links 17 in the same manner as shown by Figure 1 of the drawing.

While I have shown and described links 6 of one of the side or supporting chains, it is to be understood that this structure is duplicated on both sides of the anti-skid chain.

Having thus described the invention, what is claimed is:

1. An anti-skid chain and connecting device embodying a hook member connected to one end of the chain, said hook member having a hook formed at its free end and adapted to pass through a link at the opposite end of the chain, a substantially triangular keeper ring slidable on a link at one end of the chain, said keeper ring having a wide portion of a width equal to the width of the hook member whereby the keeper ring may be rotated and the hook member moved through the wide portion of the ring, connecting the hook member and keeper ring.

2. An anti-skid chain end connecting device embodying a hook member connected to one end of the chain, said hook member having a wide hook at its free end and adapted to pass through a ring at the opposite end of the chain, an elongated keeper member of a length to receive the hook at the free end of said hook member, slidably mounted on a link adjacent to one end of the chain, said keeper member having an offset portion permitting the keeper member to be moved to receive the wide hook at the free end of the hook member and said keeper member adapted to be moved to a position whereby the longitudinal sides thereof are disposed at right angles to the hook member, securing the hook member.

GUY MONTGOMERY.